March 5, 1946. A. N. SPANEL 2,396,212
PNEUMATIC COLLAPSIBLE BOAT
Filed Dec. 31, 1943 8 Sheets-Sheet 1

INVENTOR.

March 5, 1946. A. N. SPANEL 2,396,212
PNEUMATIC COLLAPSIBLE BOAT
Filed Dec. 31, 1943 8 Sheets-Sheet 7

March 5, 1946.  A. N. SPANEL  2,396,212
PNEUMATIC COLLAPSIBLE BOAT
Filed Dec. 31, 1943   8 Sheets-Sheet 8

INVENTOR.
Abraham N. Spanel
BY Ward Crosby & Neil
his attorneys

Patented Mar. 5, 1946

2,396,212

UNITED STATES PATENT OFFICE 2,396,212

PNEUMATIC COLLAPSIBLE BOAT

Abraham N. Spanel, Princeton, N. J.

Application December 31, 1943, Serial No. 516,472

20 Claims. (Cl. 9—2)

This invention relates to pneumatic collapsible boats and more particularly to such boats which may be readily folded to compact form and easily transported when deflated, and when inflated provide dependable rugged boat structures which may be readily handled when loaded and which are relatively seaworthy.

An object of the invention is to provide a pneumatic collapsible boat of relatively light weight and possessing stability and seaworthiness and capable of carrying a relatively heavy load compared to its weight.

Another object of the invention is to provide a pneumatic collapsible boat especially adapted for landing operations of armed forces and adapted to carry safely personnel as well as freight.

Another object of the invention is to provide a pneumatic collapsible boat having many of the characteristics of larger rigid structures, and many advantages thereover.

The invention consists in the novel features, arrangements and combination of parts embodied by way of example in the apparatus hereinafter described as illustrating the preferred form of the invention, and the invention will be more particularly pointed out in the appended claims.

Further objects, features and advantages of the invention will more clearly appear from the detailed description given below taken in connection with the accompanying drawings which form a part of the specification.

Referring to the drawings.

Figure 1:
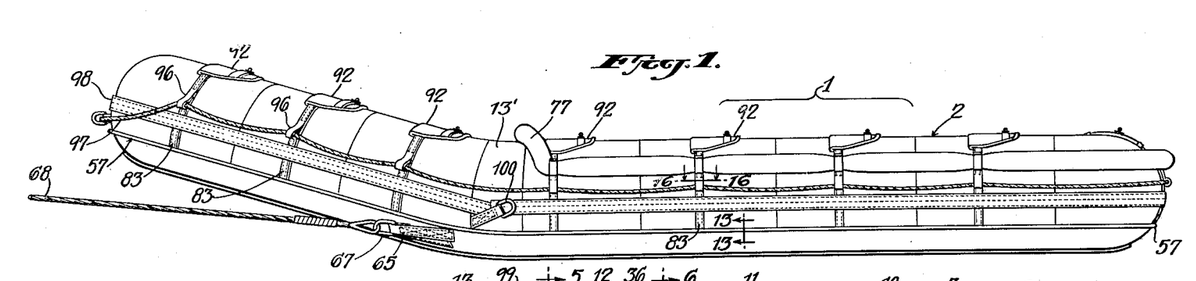
Fig. 1 is a side elevation of an embodiment of the invention especially adapted for relatively large boats.
Figure 2:
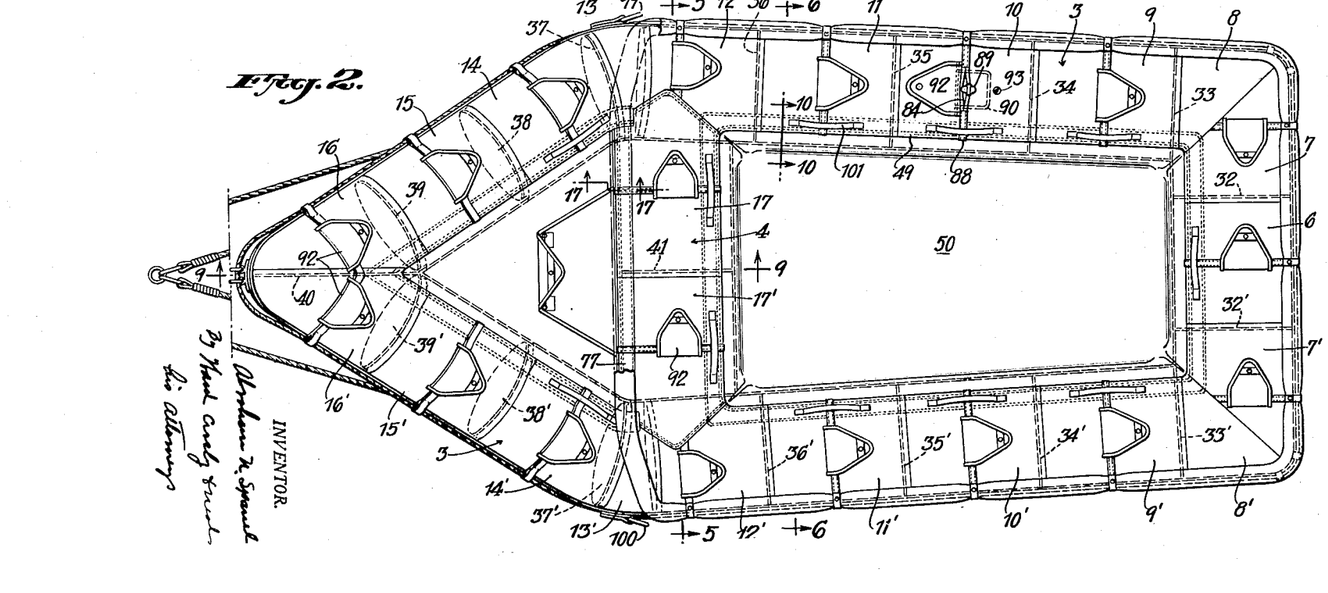
Fig. 2 is a plan top view of the boat shown in Fig. 1.

Referring to the drawings and more particularly to Figs. 1 and 2: A pneumatic collapsible boat 1 comprises a buoyant body structure designated in general as 2 and having a main body portion 3, which generally defines when inflated the boat hull outer contour and an inner hold area; and a main body bulkhead portion 4 dividing the hold area into a main hold and a bow hold. The body structure comprises a flexible casing of suitable strong relatively light material, such as canvas or duck. The fabric casing 5 comprises annular transverse sections (Fig. 2) such as 6—17 and 7'—17' inclusive. Each of these transverse sections is preferably comprised of a plurality of lengths of fabric and a typical section will be described with reference to Fig. 6, which will serve to illustrate the construction of sections, such as 6–12 and 7'–12' inclusive. Strips of fabric 18 and 19 have corresponding adjacent ends stitched together as at 20 with one of the ends such as of the strip 19 overlapping the other, to provide an extended flap portion 21 for purposes to be more particularly pointed out following. A fabric strip 22 is disposed between the other ends of the strips 18 and 19 with the corresponding adjacent end of the strip 18 disposed in overlapping relationship and stitched to the adjacent end of the strip 22 as at 23; the end of the strip 18 extending inwardly and downwardly beyond the stitching 23 to provide a flap portion 24 for the purposes to be more fully described following. The outer ends of the strips 19 and 22 are folded outwardly and are stitched together as at 25 to provide an external welt for the purposes to be more fully described hereinafter. The sections 17 and 17' (Figs. 2, 4 and 17) are similarly formed of three strips 26, 27 and 28 connected together in like manner, except that an end of the strip 26 lies over the adjacent end of strip 27, so that the resultant flap portion 29 (Fig. 17) extends forwardly. Sections 14–16 and 14'–16' inclusive (Fig. 2) are similarly formed of a plurality of strips, but in this instance only two strips are employed (Fig. 4) such as the strips 30 and 31; adjacent corresponding ends of one extremity of said strips are overlapped with the upper overlapping end extending in a direction inwardly of the bow hold area in line with the flap portions 29 at what will be referred to as the deck line, and the opposite ends of the strips 30—31 are stitched together in an external welt disposed in the peripheral zone formed as a general continuation of the above portions 25 (Fig. 6).

The adjacent side edges of the respective sections are stitched together to provide the configuration as illustrated in Fig. 2, and substantially circular flexible bulkheads or partitions, such as canvas or the like, 32–61 and 32'–39' inclusive, are disposed within said casing and stitched to the circumferential walls thereof at the juncture of the respectively adjacent casing sections so as to define a generally circular cross-section of said casing; the juncture of said casing sections and bulkheads providing circumferentially extending strengthening and stiffening means for said casing while permitting folding of the same when deflated. The casing is thus divided into a plurality of compartments or cells in which are disposed a corresponding number of pneumatic bladders, such as 42–45 inclusive (Fig. 5) and 46, 47 and 48 (Fig. 8), which may be taken as typical of the several bladders. Preferably the casing compartments are of such shape and so disposed that bladders of the same size may be utilized interchangeably. The bladders are preferably made of Vinylite or the like material in accordance with my Patent No. 2,323,629.

It is particularly noted (Figs. 1, 2 and 4) that the sections 13—13' are in the form of what I will term annular gussets whose width adjacent their upper circumferences is less than the width adjacent their lower circumferences, to thereby incline the forwardly extending portions of the casing side members upwardly to define an upwardly and forwardly inclined bow portion; and in the present embodiment the narrower portions of said annular gusset sections are disposed inwardly so as to give a forwardly converging direction to the side portions of said casing to provide a relatively pointed bow. The gussets 13—13' have their forward side edges secured at the juncture of the partition bulkheads 37—37'; but the rear edges of said annular gussets are structurally a continuation of the respectively adjacent sections 12 and 12' so as to form therewith the annular wall of the chambers or cells for containing pneumatic bladders. It is noted that the bow sections 16 and 16', which serve to connect the opposite sides of the casing at the bow, are secured at their inner edges to the bulkhead 40 to provide a common wall for the oppositely disposed forwardmost bladders, and the respective rear ends of the cells for these bladders are defined by the bulkheads 39—39'. The body bulkhead portion 4 (Figs. 2, 5 and 7) is secured in place by the respectively opposite ends of the casing sections 17—17' which are stitched to the respectively adjacent sections 12—13 and 12'—13'; and as illustrated in Fig. 5, the compartments for the bladders 42 and 43 are defined by the common bulkhead 41 at their inner ends and by the side portions of the body casing at their outer ends.

Figure 6:
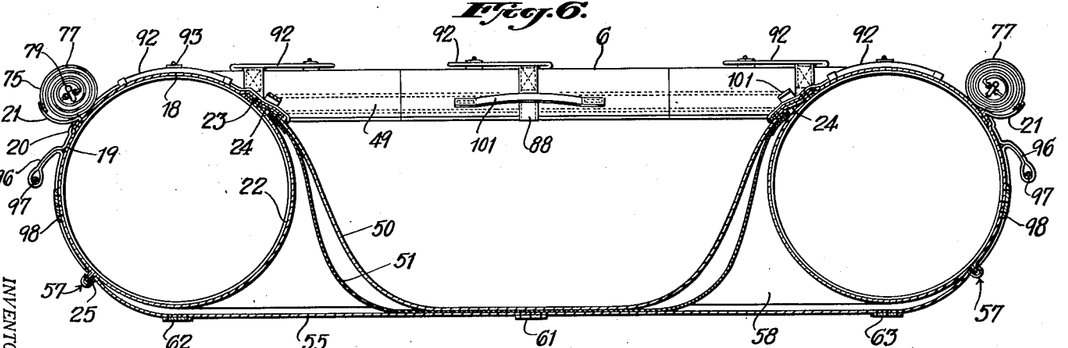
Fig. 6 is a sectional view taken at the line 6—6 of Fig. 2.
Figures 10, 11, 12, 13:
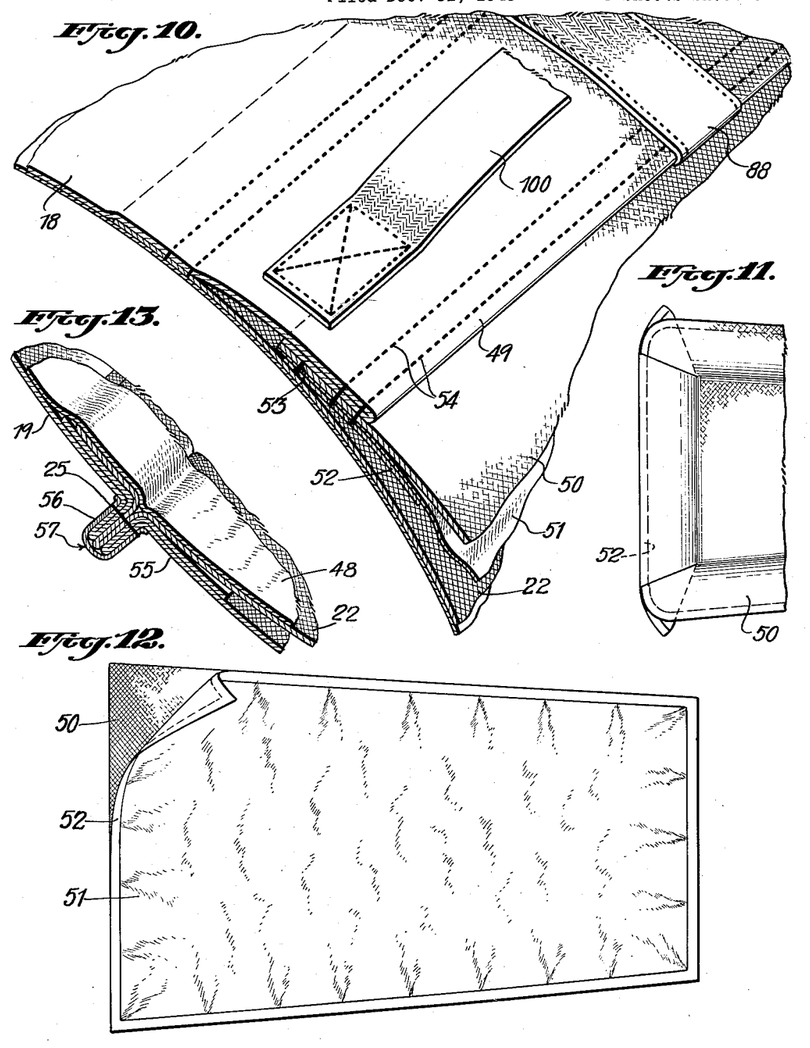
Fig. 10 is a sectional view taken along the line 10—10 of Fig. 2 showing certain structural details, particularly the means of attaching a cockpit enclosure.
Fig. 11 is a partial view showing said cockpit enclosure before it is attached.
Fig. 12 is a plan view showing said cockpit enclosure members in their extended form before being folded into the cup-shaped form of Fig. 11.
Fig. 13 is a sectional view taken at the line 13—13 of Fig. 1 showing certain structural details and particularly the attachment of a false bottom to the body structure, and a reinforcing or strengthening rib extending lengthwise of the body structure.

Referring more particularly to Figs. 6 and 10 (sheets 3 and 6), the flap portions 24 of the respective sections surrounding the main hold are stitched together along their respectively adjacent side edges to provide an inwardly and downwardly extending flap designated in general as 49, whose lower edge is preferably turned over to provide a reinforcement for attaching a cockpit enclosure. This flap extends around the inner periphery of the main hold at a zone adjacent the upper and inner cross-sectional circumference of said casing at what will be termed the deck line. The cockpit enclosure is preferably formed of a sheet of relatively strong flexible material such as the canvas sheet 50 (Fig. 12) and a somewhat larger similarly shaped sheet 51 of relatively thin flexible resilient water-impervious material which, in the present embodiment, is Vinylite and on which is provided a marginal reinforcing strip of fabric 52 intimately secured thereto. The sheets 50 and 51 are preferably first stitched together along their corresponding marginal edges as at 53; and in view of the slightly larger size of the sheet 51, it does not lie smoothly and intimately against the adjacent face of the fabric sheet 50 but is provided with a certain fullness as illustrated by the shading in Fig. 12. The attached sheets are then folded along their outer marginal areas as illustrated in Fig. 11, to provide a cockpit cup structure, and a peripheral edge thereof is stitched to the corresponding turned-over edge of the flap 49, as at 54; the stitching 53 and 54 passing through the fabric strip 52.

Figures 3, 4, 17, 18, 19:
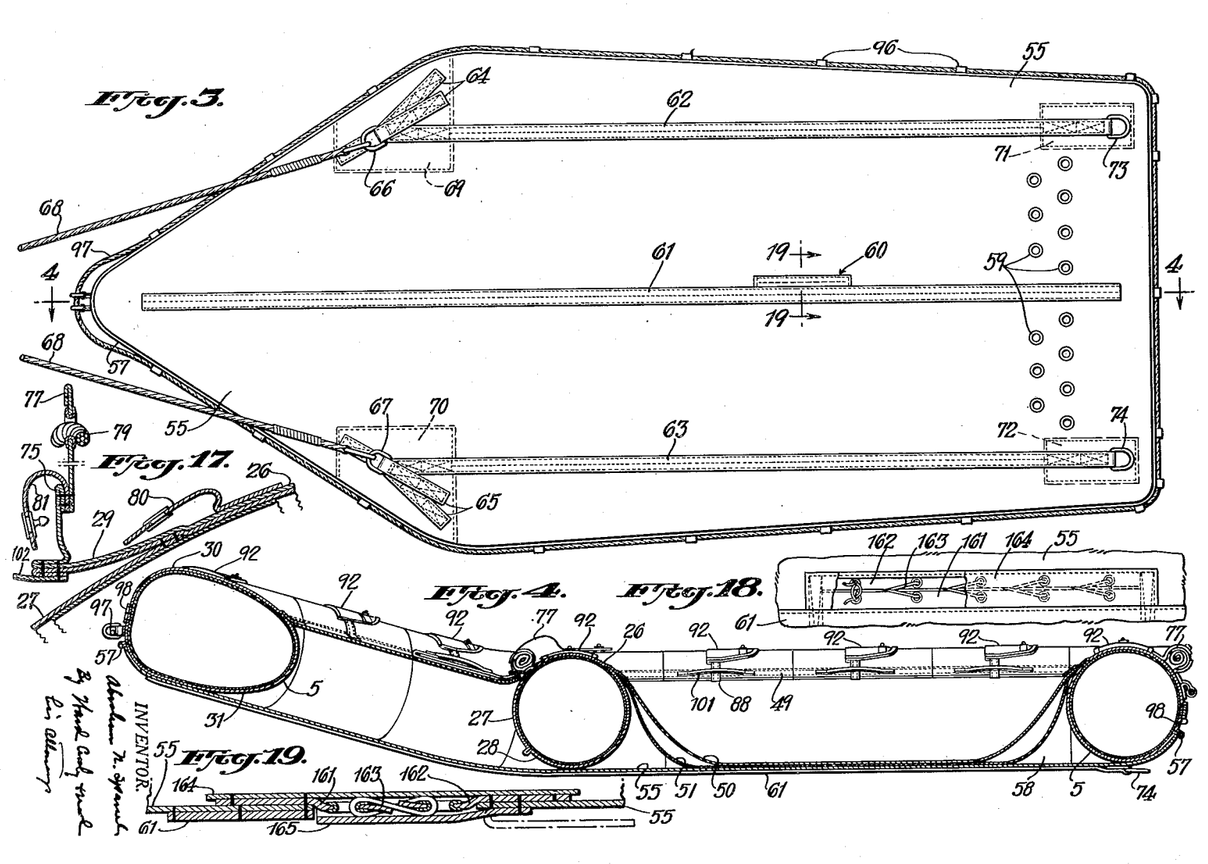
Fig. 3 is a plan bottom view of the boat shown in Figs. 1 and 2.
Fig. 4 is a sectional view taken at the line 4—4 of Fig. 3.
Fig. 17 (sheet 2) is a sectional view taken at the line 17—17 of Fig. 2 showing the details of attachment of a forward deck portion and adjacent cockpit curtain.
Fig. 18 is a partial view of a portion of the false bottom shown in Fig. 3 showing certain details of a hand-hole provided therein.
Fig. 19 is a sectional view taken along the line 19—19 of Fig. 3 and showing further details of the hand-hole illustrated in Fig. 18.

Referring more particularly to Figs. 4 and 6, it will be seen that the foregoing structure provides an inner cockpit cup formed by the fabric sheet 50 having continuous bottom and side walls which serve to carry the cockpit load and by an outer water-impervious cockpit cup having continuous bottom and side walls by the sheet 51 which, in view of its larger size, is relieved of the strains imposed on the fabric sheet 50. A flexible false bottom 55 (Fig. 3) of suitable material, such as relatively heavy canvas, is disposed beneath the casing and extends upwardly and outwardly along the outer peripheral sides of said casing (Figs. 4, 5 and 6) with its marginal edge overlying the external welt formed by the attached edges of the strip such as 19—22 (Fig. 13) and 30—31 (Fig. 4), the outer marginal edge of said bottom 55 being stitched to and forming a part of said outer welt. A binding strip 56 (Fig. 13) is disposed over the stitched edges of the bottom 55 and section strips, thus providing a radially outwardly directed reinforcing rib designated in its entirety as 57, and extending longitudinally of said casing and around the perimeter of said boat.

Figure 5:
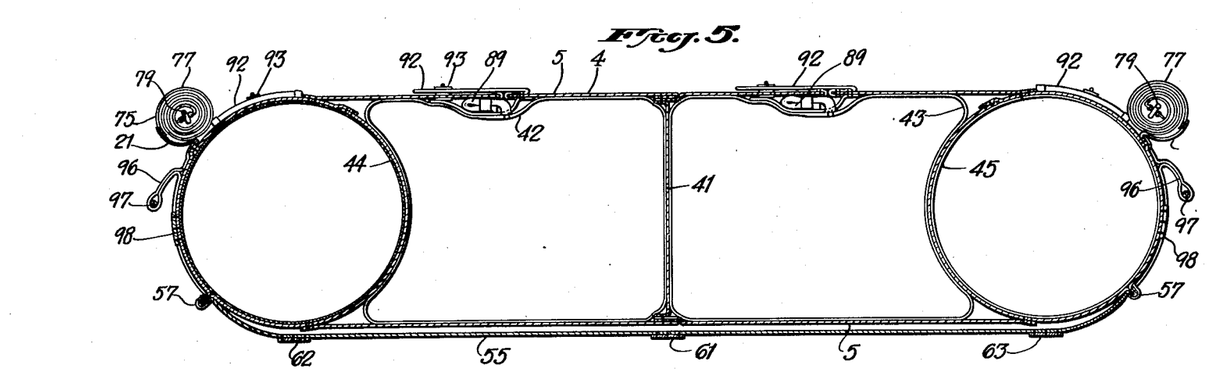
Fig. 5 is a sectional view taken at the line 5—5 of Fig. 2.

With reference to Figs. 4, 5 and 6, it will be seen that the cockpit enclosure has its bottom, corresponding to the central areas of the sheets 50 and 51, disposed adjacent the inner face of the false bottom 55. It will also be seen with reference to these figures that the main body portion and bulkhead portion of the body, the false bottom 55, and the cockpit enclosure jointly form a space designated as 58. Limited access of water to this space is provided by restricted openings (Fig. 3) such as 59, preferably suitably reinforced as by grommets; thereby providing a restricted flow of water into said space which thereby serves as a ballast tank. The holes 59 are preferably disposed adjacent the stern of the boat to prevent undue entrapment of water in the ballast tank when the boat is moving forward, as by towing, at a relatively fast rate. The false bottom 55 is provided with a hand-hole opening designated in general as 60 to be more particularly described following, which is preferably disposed centrally beneath the cockpit to provide access to the space 58 for the purpose of cleaning out sediment, such as mud, which might be deposited in said space by the water passing therein through the holes 59, and also providing means for repairs, more especially such as may be necessary to the relatively thin sheet 50.

Longitudinally extending laterally spaced relatively heavy flexible strips such as 61, 62 and 63 (Figs. 3, 4, 5 and 6), preferably made of heavy fabric webbing, are stitched to the false bottom 55. The strips extend lengthwise of the boat for substantially the full length of the bottom; the strip 61 extending from beneath the forward cross-section of the body (Fig. 4) to beneath the rear cross-section of the body casing and the strips 62—63 being disposed beneath the respective lower cross-sectional circumferences of the opposite casing sides (Figs. 5 and 6) and extending substantially throughout the length of the bottom at these positions, i. e., from adjacent the gusset sections 13—13' rearwardly. Pull strap webbings, such as 64 and 65 (Figs. 3 and 1), are stitched to the bottom 55 preferably intersecting the forwardly extending ends of the strips 62—63 and inclined outwardly and rearwardly; and tow rings 66—67 are secured thereto and serve as means of attachment for the ends of a bridle tow rope such as 68. Reinforcing patches 69—70 are preferably stitched to the interior of the bottom 55 and to the strips 62—63 and straps 64—65; and reinforcing strips of fabric such as 71—72 are preferably stitched to the rear ends of the strips 62—63 and adjacent portions of the false bottom 55, so as to provide means of load distribution for rings 73—74 which are secured to the respective rear ends of the strips 62—63.

The hand-hole 60 (Figs. 3, 18 and 19) is provided by an opening in the false bottom 55, the opposite sides of which are stitched to fabric strips 161—162 provided with eyelets through which passes a lace 163 which serves to releasably hold the strips 161—162 in closed position. An inner tongue 164 is disposed over the inner side of the bottom 55 extending over the strips 161—162 and is stitched to the bottom 55 adjascent the strip 61 and along the relatively opposite ends but is left free along the side opposite the strip 61 to permit access between the tongue 164 and the strip 162 along the unstitched side. An external flap 165 is secured to the bottom 55 around three sides but is left free at an edge immediately adjacent the strip 61; the tongue 164 and the flap 165 serving as a means of covering the lacing 163 but providing oppositely disposed openings for access to the interior space 58 when desired.

Figure 7:
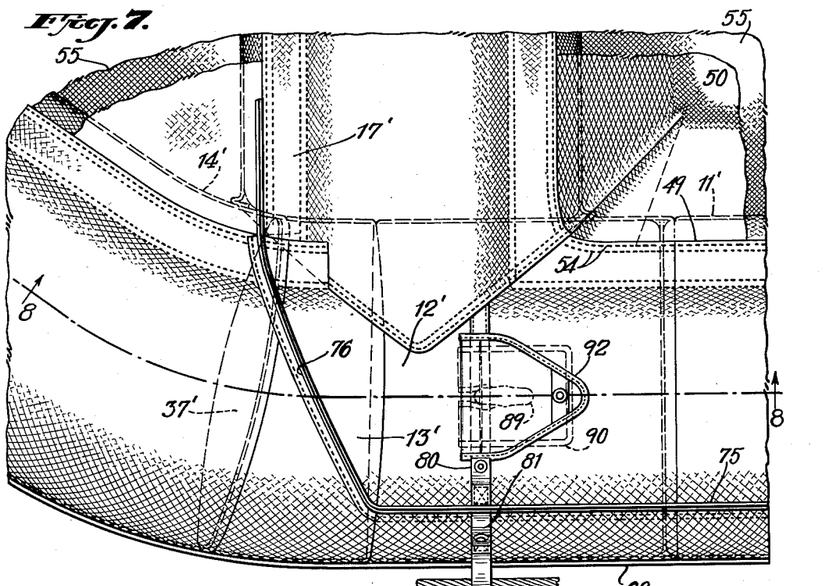
Fig. 7 is a somewhat enlarged plan view of a portion of the boat shown in Fig. 2.
Figures 14, 15:
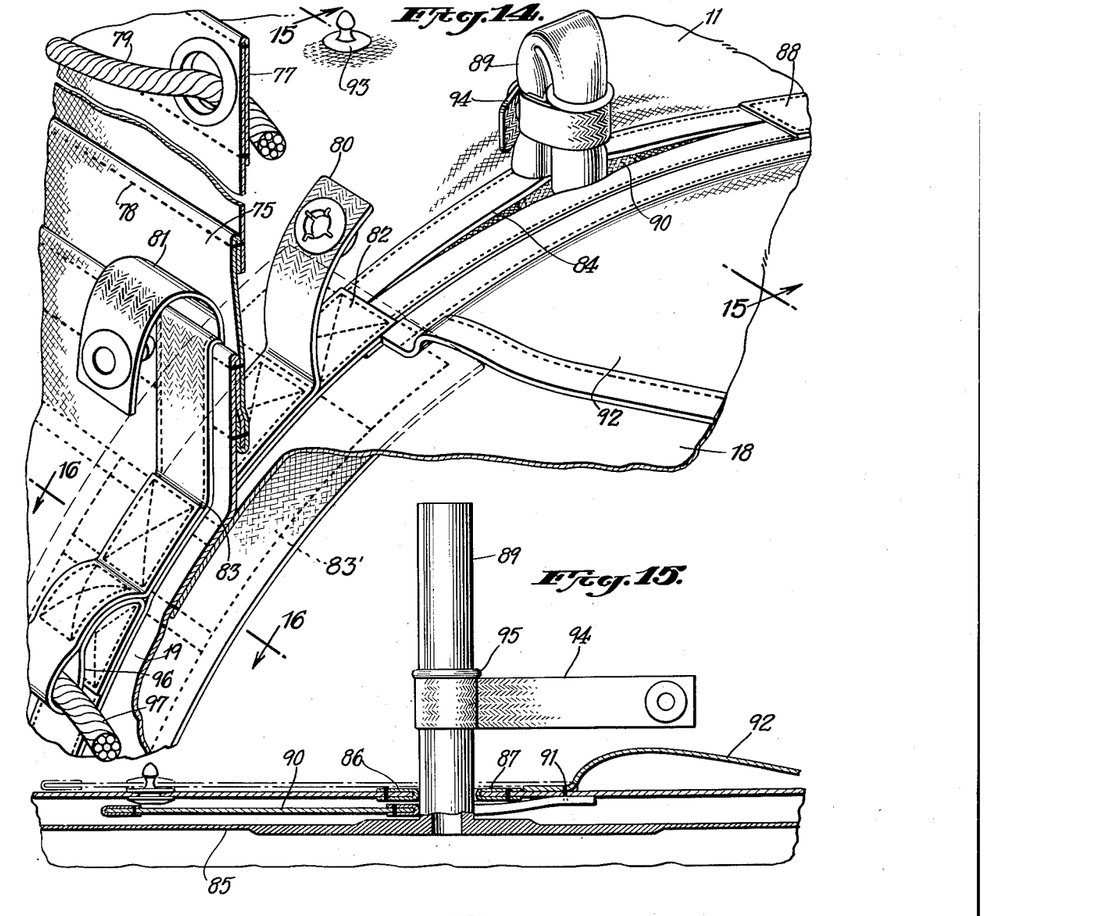
Fig. 14 is a partial sectional view showing further details of construction and especially the attachment of the cockpit curtain or tarpaulin, transversely extending reinforcements and means for supporting a rope or the like girdle around the outer perimeter of said boat.
Fig. 15 is a sectional view taken along the line 15—15 of Fig. 14.
Figure 16:
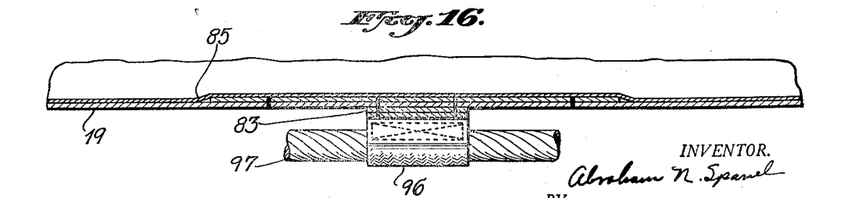
Fig. 16 is a sectional view taken along the line 16—16 of Fig. 14.

Referring more particularly to Figs. 4, 5 and 14: the extending flap portions 21, and corresponding flap portions provided on the body bulkhead portion, are stitched together along their side edges so as to provide a continuous flap designated in general as 75 (Fig. 14) which is therefore spaced outwardly from the cockpit flap 49 (Figs. 2 and 10); it being noted that continuity of this flap from the casing sections 12 to 17 and 12' to 17' (Figs. 2 and 7) is provided by a supplemental flap member designated 76 (Fig. 7). The lower edge of a cockpit curtain such as a canvas sheet or tarpaulin 77 (Fig. 14) is stitched continuously around the flap 75 as at 78, and the curtain 77 is preferably provided with a drawstring 79. When in use, thus curtain may be extended as indicated in Fig. 14 and may be closed together at the top by the drawstring so as to protect the occupants or freight disposed in the cockpit. When not in use, the curtain may be folded as indicated in Figs 1-6 inclusive, and may be held in position by detachable curtain straps 80—81. These straps are secured at their inner ends to reinforcing webbings 82 and 83 respectively. The inner end of the webbing 83 preferably extends upwardly and is stitched to the cockpit flap 75, and its lower end is stitched downwardly along the outside circumference of respective casing sections to, and is preferably included within, the welt rib 57 (Fig. 1). The reinforcing web 82 extends inwardly from the strap 80 and is stitched to the respectively corresponding casing section opposite to a slit opening 84 provided adjacent the center of respective casing sections for one of said bladders designated as 85 in Fig. 15, and said slit opening 84 is provided along its opposite edges with reinforcing fabric bindings, such as 86—87, forming in effect a continuation of the reinforcing web 82 and serving to carry such reinforcements transverse said casing to the inner end of a reinforcing web 88 which preferably continues transversely across said casing to and has its inner end stitched to the cockpit flap 49 (Fig. 10). A reinforcing patch 83' (Fig. 14) is preferably disposed interiorly of the casing beneath the webs 82—83 and is stitched thereto. It will thus be seen that reinforcement strips are provided extending circumferentially of said casing sections at spaced longitudinal intervals of said casing so as to distribute the major loads imposed upon said casing, and these transversely extending reinforcements are preferably disposed intermediate the casing bulkheads or partitions, and also serve to reinforce the casings where slits are provided therethrough for said bladders.

Figure 8:
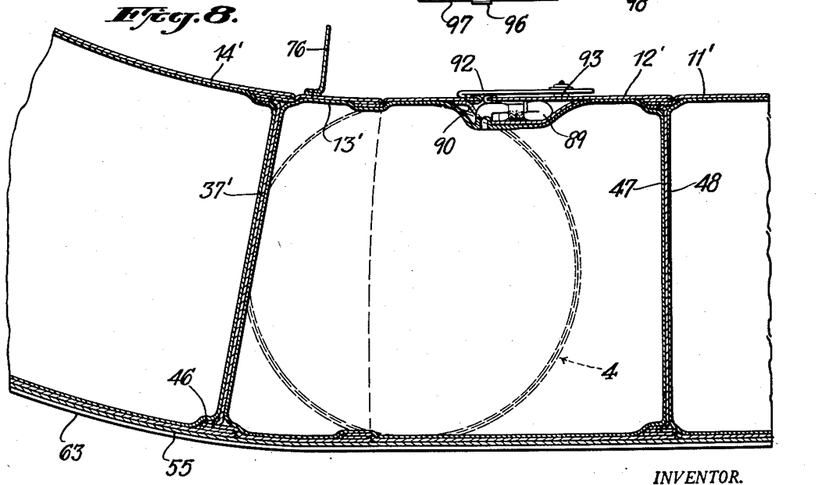
Fig. 8 is a sectional view taken along the line 8—8 of Fig. 7.

The respective bladders are provided with filling tubes, designated 89 in Figs. 14 and 15, and after the bladders have been inserted in their respective cells through the slits such as 84, the bladder tubes are inserted through an opening in respective tongues, such as 90, which are secured along one edge to the interior of the casing as at 91. Flaps 92 are provided for closing the slit openings 84 and are releasably held in closed position by suitable fastening means such as 93. When the bladders have been inflated, they are bent over as indicated in Fig. 14 and closed by the strap fastening means designated as 94, and after being so closed the bladder tube is inserted through the slit 84, the strap closure 92 is secured in position as indicated in Figs. 5 and 8. It will be noted from Fig. 15 that I have provided a bead 95 on the tube 89 to hold the strap 94 in position when the tube is extended.

Referring to Figs. 1, 3, 14 and 16: it will be seen that heavy fabric webbing loops, such as 96, are secured to the reinforcements, such as the webbing strips 83, and to the adjacent casing providing means for supporting a girdle rope 97 which passes through said loops and around the perimeter of said boat. This girdle is preferably supported from a position adjacent the outer cross-sectional circumference of said casing (Figs. 1 and 5) and adjacent thereto in a substantially parallel zone surrounding said boat is secured a chafing strip, such as a web of heavy canvas or the like material 98, which is stitched to said casing and said reinforcements such as 83; the chafing strip 98 also serving as a longitudinal stiffening member supplemental to the rib 57. Attachment rings such as 99—100 (Fig. 1) are secured to said casing adjacent the gusset sections 13—13' at the zone of said chafing strip 98.

The casing is preferably provided with a plurality of hand grips, such as 101 (Fig. 2), preferably made of heavy fabric and stitched to the flap 49 (Fig. 10) on respectively opposite sides of the reinforcement webs such as 88.

Figures 9, 20:
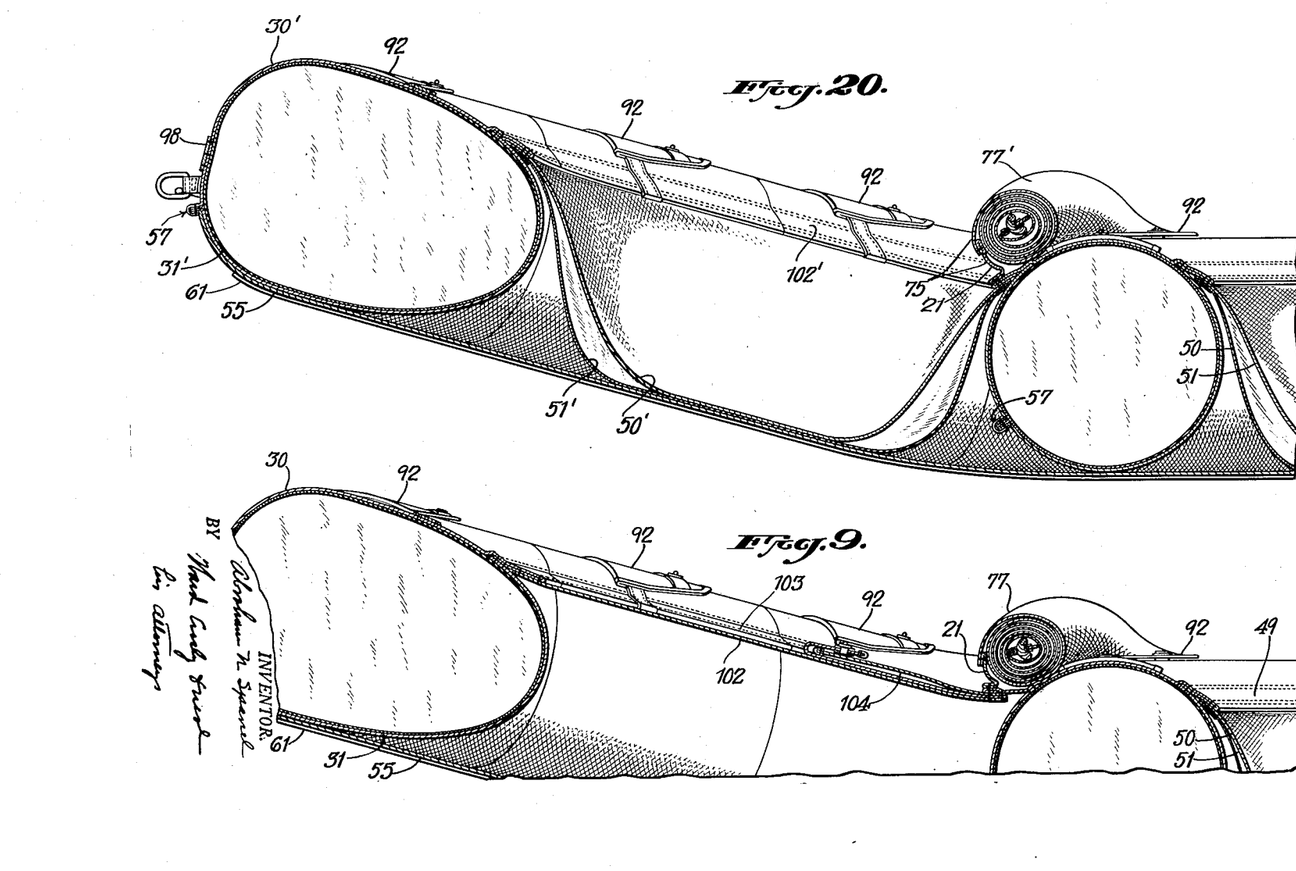
Fig. 9 is a sectional view taken along the line 9—9 of Fig. 2.
Fig. 20 (sheet 5) is a cross-sectional view similar to that of Fig. 9 but showing a modification in which the forward hold of the boat is provided with a forward cockpit instead of with a deck as illustrated in Fig. 9.

Referring to Fig. 9, it will be seen that a flexible deck 102 made of canvas or other suitable material, is secured along the deck line to the inwardly extending flap designated 103, and forming a continuation of the forward section of the cockpit curtain flap 75. A pocket 104 is preferably secured to said deck adjacent the cockpit curtain 77 to provide a convenient place to carry spare bladders and a repair knit therefor.

In the modification illustrated in Fig. 20, instead of the front hold being covered by a deck, it is provided with an enclosure which may take the form of that previously described in connection with the main cockpit, and the enclosure in the present modification is illustrated as comprising a fabric cup 50' and a thin flexible resilient water-impervious cup such as 51' having their upper marginal edges secured to the flap 102' in the manner previously described in connection with the main cockpit.

*Double-ended boat*

Figure 21:
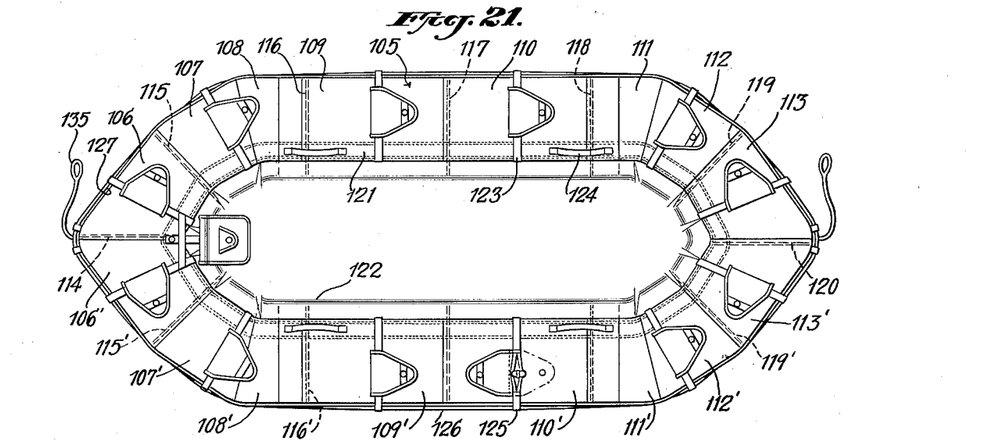
Figs. 21, 22 and 23 are respectively a top plan view, a side elevation, and a bottom plan view of a modified structure showing a double-ended boat.
Figure 22:
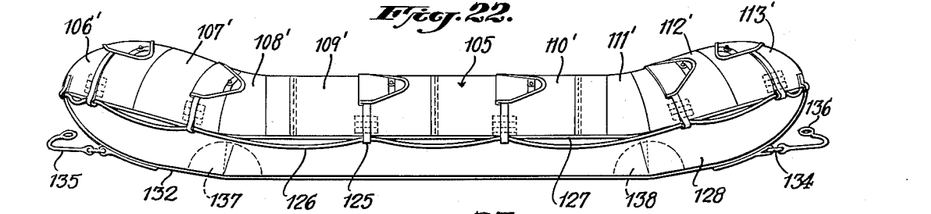
Figure 23:
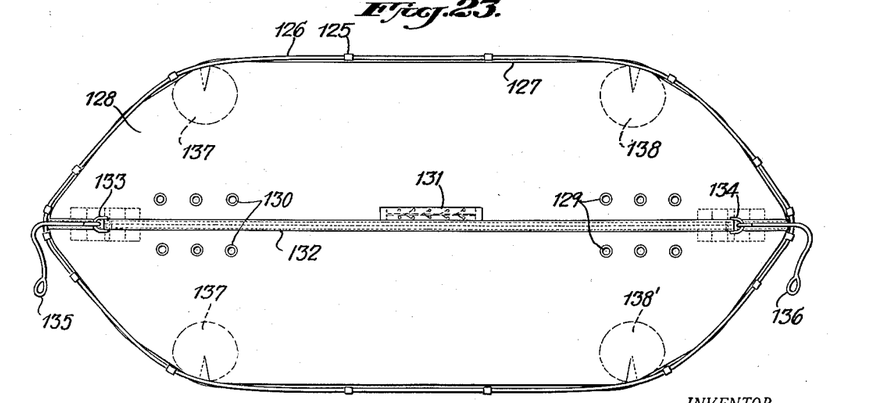

A modified embodiment of the invention is illustrated in Figs. 21, 22 and 23 in which a buoyant body is designated in general as 105 and which defines by its inner perimeter a single hold and by its outer perimeter a boat hull outer contour. As in the previous embodiment, the body comprises an outer fabric casing similarly formed of annular transverse casing sections, such as 106-113 and 106'-113' inclusive; the sections 108—108' and 111—111' being in the form of annular gussets as previously described in connection with the other embodiment, and in this instance providing a double-ended boat provided with two bows each disposed in general in accordance with the previously described embodiment. In this instance, the gussets 108—108' and 111—111' are preferably made of two widths, the ones of each pair toward the bows of the boat serving to incline the sides inwardly and the other ones of each pair serving to incline the sides upwardly starting at the seams joining said respective pairs. Similarly, transversely extending substantially circular bulkheads, such as 114—120 and 115'—119', are disposed within said casing and similarly secured to circumferential casing walls as previously described so as to provide a plurality of compartments or cells in which are suitably disposed inflatable bladders. The casing sections are formed and disposed to provide an inwardly extending flap, such as 121, surrounding the hold area in the manner previously described and similarly supporting a cockpit enclosure designated in general as 122, constructed and arranged as previously described. Transversely extending reinforcements, designated in general as 123, are formed and disposed in the manner previously described as are also a plurality of hand grips 124.

Referring more particularly to Figs. 22 and 23: supporting loops, such as 125, are secured to the casing adjacent the reinforcements 123 serving to support a girdle rope 126 in the manner previously described in connection with the foregoing embodiment.

A reinforcing rib, designated in general as 127, is formed and disposed as previously described in connection with the corresponding rib 57, and a continuous false bottom 128 made of canvas or the like material is disposed over the bottom of the boat with its marginal edges extending upwardly and around said casing and secured to the side walls thereof at said reinforcing rib 127, in the manner previously described. Suitable holes, such as 129—130, are disposed respectively adjacent the relatively opposite bow portions of said boat and, as in the previous embodiment, serve as restricted openings permitting water to pass into a ballast tank provided jointly by the casing walls, cockpit lining and false bottom. A hand hold similar to that previously described is provided centrally of the bottom 128 and is designated in general as 131, being positioned adjacent a longitudinally extending axially disposed reinforcing fabric strip 132 which in this instance extends the entire length of the boat and carries secured adjacent its opposite ends tow rings 133—134, to which are attached the inner ends of tow ropes 135—136. Reinforcing patches 137—138 and 137'—138' are secured to the bottom 128 adjacent the respective gusset sections, and extend partly under the boat and partly upwardly thereabout to adjacent the reinforcing rib 127.

Boats made according to the first embodiment (i. e., as shown in Figs. 1, 2, etc.) have been made by me of such size as to accommodate five or six men comfortably or 2,000 pounds of freight, and the complete boat when empty weighs only approximately from 30 to 68 pounds complete with tow ropes, tarpaulin curtain, spare bladders and kit, etc. Double-ended boats made in accordance with the embodiment of Figs. 21-23 inclusive have been made by me to accommodate three men comfortably and weigh complete when empty only approximately 15 pounds.

Both types have proven to be exceptionally seaworthy, stable, dependable and rugged.

Having thus described my invention with particularity, with reference to the preferred embodiment of the same, and having referred to certain modifications thereof, it will be obvious to those skilled in the art, after understanding my invention, that other changes and modifications may be made therein without departing from the spirit or scope of my invention and I aim in the appended claims to cover such changes and modifications as are within the scope of the invention.

What I claim is:

1. A pneumatic collapsible boat comprising a buoyant body generally defining when inflated the boat hull outer contour and inner hold area, said body having a hollow fabric casing of generally circular cross-section with integral transversely extending bulkheads dividing said casing into a plurality of individual compartments, pneumatic bladders disposed in respective of said compartments, a fabric cup having a bottom and side walls, and a thin flexible resilient water-impervious sheet provided with a fabric strip intimately secured to the marginal edge thereof, said sheet being folded so as to lie exteriorly of said bottom and side walls of said cup with the corresponding marginal edges of said cup and sheet being stitched to an integral part of said casing adjacent the upper cross-sectional circumference thereof, said cup and sheet when so secured being of such fullness as to extend downwardly within said hold to provide a cockpit for said boat.

2. A pneumatic collapsible boat comprising a buoyant body generally defining when inflated the boat hull outer contour and inner hold area, said body having a hollow fabric casing of generally circular cross-section with integral transversely extending bulkheads dividing said casing into a plurality of individual compartments, a fabric sheet, and a thin flexible resilient water-impervious sheet provided with a fabric strip intimately secured to the marginal edge thereof, said fabric sheet being superimposed over said resilient sheet and their corresponding marginal edges being stitched to an integral part of said casing adjacent the inner upper cross-sectional circumference thereof with the stitching passing through said fabric strip, said sheets when so secured being of such fullness as to extend downwardly within said hold to provide a cockpit for said boat.

3. A pneumatic collapsible boat comprising a buoyant body generally defining when inflated the boat hull outer contour and inner hold area, said body having a hollow fabric casing of generally circular cross-section with integral transversely extending bulkheads dividing said casing into a plurality of individual compartments, pneumatic bladders disposed in respective of said compartments, a fabric sheet, and a thin flexible resilient water-impervious sheet of larger size than said fabric sheet provided with a fabric strip intimately secured to the marginal edge thereof, said fabric sheet being superimposed over said resilient sheet and their corresponding marginal edges being stitched to an integral part of said casing adjacent the inner upper cross-sectional circumference thereof with the stitching passing through said fabric strip, said sheets when so secured being of such fullness as to extend downwardly within said hold to provide a cockpit for said boat, and the larger size of said resilient sheet providing greater fullness, whereby said resilient sheet is relieved of stress when said cockpit is loaded.

4. In a pneumatic collapsible boat the combination of a buoyant body generally defining when inflated the outer boat hull contour and central cockpit area, said body comprising a fabric casing divided into a plurality of individual compartments by transversely extending bulkheads secured within said fabric casing and pneumatic bladders disposed in respective of said compartments, a fabric bottom disposed beneath said body casing and secured along its peripheral edge to an outer peripheral zone of said casing to thereby provide a continuous false bottom for said boat, a cockpit cup comprising a sheet of fabric disposed within the cockpit area with its central area adjacent the inner face of said bottom member and with a marginal area folded to conform to and extending upwardly along the inner contour of said body and having its marginal edges secured to said body casing, a water-impervious enclosure for said cup disposed thereabout and between said cup and false bottom comprising a relatively thin pliant sheet apron having a central area disposed adjacent the bottom face of said cockpit cup and a marginal area folded to conform to and extending upwardly along the inner contour of said body and carrying intimately secured to its marginal edge a fabric strip which is secured to said fabric body casing and cup adjacent the secured edge of said cup.

5. A pneumatic collapsible boat comprising a buoyant body generally defining when inflated the boat hull outer contour and inner hold area, said body having a hollow fabric casing of generally circular cross-section with integral transversely extending flexible bulkheads dividing said casing into a plurality of individual compartments, said casing comprising a plurality of transversely extending sections whose respectively adjacent side edges are stitched together in seams to provide the lengthwise extent of said casing, said bulkheads being substantially circular with their circumferential edges stitched to said casing at said section seams to define said circular cross-section, pneumatic bladders disposed in respective of said compartments, said casing sections being provided respectively by strips of fabric having adjacent ends joined together in an exterior welt at a zone extending longitudinally of said casing and disposed at the outer circumference of said casing sections, a fabric bottom disposed beneath said body and secured along its marginal edge to said welt and forming therewith an outwardly radially disposed rib extending longitudinally of said casing.

6. A pneumatic collapsible boat comprising a buoyant body generally defining when inflated the boat hull outer contour and inner hold area, said body having a hollow fabric casing of generally circular cross-section with integral flexible transversely extending bulkheads dividing said casing into a plurality of individual compartments, said casing comprising a plurality of transversely extending sections whose respectively adjacent sides are stitched together to provide the lengthwise extent of said casing, said bulkheads being substantially circular with their peripheral edges stitched at the juncture of said sections to define said circular cross-section, pneumatic bladders disposed in respective of said compartments, said casing sections being provided respectively by strips of fabric having adjacent overlapping ends stitched together at a zone extending longitudinally of said casing and disposed at the inner upper circumference of said transverse casing sections, the upper overlapping ends of respective of said strips being secured together along their side edges and extending inwardly and downwardly to provide a flap, and a flexible cockpit cup disposed within said hold with its marginal edge stitched to said flap.

7. A pneumatic collapsible boat comprising a buoyant body generally defining when inflated the boat hull outer contour and inner hold area, said body having a hollow fabric casing of generally circular cross-section with integral flexible transversely extending bulkheads dividing said casing into a plurality of individual compartments, said casing comprising a plurality of transversely extending sections whose respectively adjacent sides are stitched together to provide the lengthwise extent of said casing, said bulkheads being substantially circular with their peripheral edges stitched at the juncture of said sections to define said circular cross-section, pneumatic bladders disposed in respective of said compartments, said casing sections respectively comprising a plurality of strips, corresponding adjacent ends of two of said strips being overlapped and stitched together at a zone extending longitudinally of said casing and disposed at the inner upper circumference of said transverse casing sections, the upper overlapping ends of respective of said strips being secured together along their side edges and extending inwardly and downwardly to provide a flap, a flexible cockpit cup disposed within said hold with its marginal edge stitched to said flap, the opposite corresponding adjacent ends of two of said strips being stitched together in an exterior welt at a zone extending longitudinally of said casing and disposed at the outer circumference of said casing sections to thereby provide an outwardly radially disposed body-reinforcing rib extending longitudinally of said casing.

8. A pneumatic collapsible boat comprising a buoyant body generally defining when inflated the boat hull outer contour and inner hold area, said body having a hollow fabric casing of generally circular cross-section with integral flexible transversely extending bulkheads dividing said casing into a plurality of individual compartments, said casing comprising a plurality of transversely extending sections whose respectively adjacent sides are stitched together to provide the lengthwise extent of said casing, said bulkheads being substantially circular with their peripheral edges stitched at the juncture of said sections to define said circular cross-section, pneumatic bladders disposed in respective of said compartments, said casing sections respectively comprising a plurality of strips, corresponding adjacent ends of two of said strips being overlapped and stitched together at a zone extending longitudinally of said casing and disposed at the inner upper circumference of said transverse casing sections, the upper overlapping ends of respective of said strips being secured together along their side edges and extending inwardly and downwardly to provide a flap, a flexible cockpit cup disposed within said hold with its marginal edge stitched to said flap, the opposite corresponding adjacent ends of two of said strips being stitched together in an exterior welt at a zone extending longitudinally of said casing and disposed at the outer circumference of said casing sections, and a fabric bottom disposed beneath said body and secured along its marginal edge to said welt and forming therewith an outwardly radially disposed body-reinforcing rib extending longitudinally of said casing.

9. A pneumatic collapsible boat comprising a buoyant body having an inflatable main body portion generally defining when inflated the boat hull outer contour and inner hold area and an inflatable body bulkhead portion extending transversely of said main hull substantially from the bottom to the top of said hull to thereby divide said hold into a main hold and a bow hold, said body portions comprising a unitary fabric casing of generally circular cross-section with transversely extending flexible bulkheads secured therein in spaced relation and dividing said casing into a plurality of individual compartments, and pneumatic bladders disposed in respective of said compartments.

10. A pneumatic collapsible boat comprising a buoyant body having an inflatable main body portion generally defining when inflated the boat hull outer contour and inner hold area and an inflatable body bulkhead portion extending transversely of said main hull and dividing said hold into a main hold and a bow hold, said body portions comprising a unitary fabric casing of generally circular cross-section with transversely extending flexible bulkheads secured therein in spaced relation and dividing said casing into a plurality of individual compartments, pneumatic bladders disposed in respective of said compartments, a cockpit cup comprising a sheet of fabric attached at its marginal edges to said casing at an upper circumferential position on said main body portion and bulkhead portion surrounding said main hold, and a cockpit cover comprising a curtain secured at a marginal edge to said casing along a perimeter spaced outwardly from the cockpit cup and disposed at the upper outer circumferential position of said main body portion and bulkhead portion.

11. A pneumatic collapsible boat comprising a buoyant body having an inflatable main body portion generally defining when inflated the boat hull outer contour and inner hold area and an inflatable body bulkhead portion extending transversely of said main hull and dividing said hold into a main hold and a bow hold, said body portions comprising a unitary fabric casing of generally circular cross-section with transversely extending flexible bulkheads secured therein in spaced relation and dividing said casing into a plurality of individual compartments, pneumatic bladders disposed in respective of said compartments, a cockpit cup comprising a sheet of fabric attached at its marginal edges to said casing at an upper circumferential position on said main body portion and bulkhead portion surrounding said main hold, and a fabric deck attached to said casing at an upper circumferential portion on said main body portion and bulkhead portion surrounding said bow hold.

12. A pneumatic collapsible boat comprising a buoyant body having an inflatable main body portion generally defining when inflated the boat hull outer contour and inner hold area and an inflatable body bulkhead portion extending transversely of said main hull and dividing said hold into a main hold and a bow hold, said body portions comprising a unitary fabric casing of generally circular cross-section with transversely extending flexible bulkheads secured therein in spaced relation and dividing said casing into a plurality of individual compartments, pneumatic bladders disposed in respective of said compartments, a cockpit cup comprising a sheet of fabric attached at its marginal edges to said casing at an upper circumferential position on said main body portion and bulkhead portion surrounding said main hold, and a second cockpit cup comprising a sheet of fabric attached at its marginal edges to said casing at an upper circumferential position on said main body portion and bulkhead portions surrounding said bow hold.

13. A pneumatic collapsible boat comprising a buoyant body having an inflatable main body portion and an inflatable transverse body bulkhead portion, said main body portion generally defining when inflated the boat hull outer contour and inner hold area, said body bulkhead portion serving to divide said hold area into a cockpit area and a forward area, said body having a hollow fabric casing of generally circular cross-section with integral flexible transversely extending bulkheads dividing said casing into a plurality of individual compartments, said casing comprising a plurality of transversely extending sections whose respectively adjacent sides are stitched together to provide the lengthwise extent of said casing, said bulkheads being substantially circular with their peripheral edges stitched at the juncture of said sections to define said circular cross-section, pneumatic bladders disposed in respective of said compartments, said casing sections defining said cockpit comprising respectively first, second and third strips, said first and second strips having corresponding adjacent ends stitched together at a zone extending longitudinally of said casing and disposed at the inner upper circumference of said transverse casing sections, the upper overlapping ends of respective of said strips being secured together along their side edges and extending inwardly and downwardly to provide a cockpit flap, a fabric cockpit lining disposed within said hold with its marginal edge stitched to said flap, the other ends of respective of said second strips and the corresponding adjacent ends of said third strips being stitched together in an exterior welt at a zone extending longitudinally of said casing and disposed at the outer circumference of said casing sections, a fabric bottom disposed beneath said body and secured along its marginal edge to said welt and forming therewith an outwardly radially disposed body-reinforcing rib extending longitudinally of said casing, the other ends of respective of said first and third strips being stitched together in overlapped relationship at a zone extending longitudinally of said casing and circumferentially disposed intermediate said welt and first overlapped seam, the upper overlapping ends of said respective first and third strips being secured together along their side edges to provide a cover flap extending around said cockpit, and a cockpit cover curtain surrounding said cockpit and having a marginal edge secured to said cover flap.

14. A pneumatic collapsible boat comprising a buoyant body generally defining when inflated the boat hull outer contour and inner hold area, said body having a hollow fabric casing of generally circular cross-section with integral transversely extending bulkheads dividing said casing into a plurality of individual compartments, said casing comprising a plurality of transversely extending sections including a pair of oppositely disposed annular gussets of narrower width adjacent their upper peripheries and increasing in width toward their lower peripheries to thereby provide upwardly forwardly inclined side portions forming a forwardly upwardly inclined bow, pneumatic bladders disposed in respective of said compartments, a fabric bottom sheet disposed beneath said body and secured along its edge to an outer peripheral zone of said casing spaced upwardly and outwardly along the cross-sectional circumference thereof, to thereby provide a continuous outer bottom extending over the lower portion of said body and upwardly thereabout for a substantial extent along the exterior sides of said hull, a pair of laterally spaced relatively heavy fabric webs stitched to said bottom sheet longitudinally of said hull for substantially the entire length from adjacent said gussets rearwardly, said webs being disposed substantially centrally beneath respectively opposite longitudinally extending sides of said buoyant body, and tow line pull webs stitched to said casing adjacent the respective gussets and diverging outwardly and rearwardly from said longitudinal webs, said pulls providing oppositely disposed means for attaching a tow line to the boat, whereby the tow line force is exerted adjacent the boat bottom at the bow juncture and is distributed over a substantial area of the bottom sheet by said longitudinal webs and tow line pull webs.

15. A pneumatic collapsible boat comprising a buoyant body generally defining when inflated the boat hull outer contour and inner hold area, said body having a hollow fabric casing of generally circular cross-section with integral transversely extending bulkheads dividing said casing into a plurality of individual compartments, said casing comprising a plurality of transversely extending sections including a pair of oppositely disposed annular gussets of narrower width adjacent their upper peripheries and increasing in width toward their lower peripheries to thereby provide upwardly forwardly inclined side portions, said side portions being joined together to provide a forwardly upwardly inclined bow, pneumatic bladders disposed in respective of said compartments, a fabric bottom disposed beneath said body and secured along its edge to a peripheral zone of said casing conforming in general to the contour of said boat and providing a false bottom, a flexible cockpit enclosure providing a continuous bottom and side walls, said enclosure being attached along its upper marginal edge to a peripheral zone of said casing disposed at the upper cross-sectional circumference thereof, the bottom of said enclosure being disposed adjacent the upper face of said false bottom, said false bottom being provided with a slit opening for ready access to the space between the fabric cup member and said false bottom, and closure means for said opening.

16. A pnuematic collapsible boat comprising a buoyant body generally defining when inflated the boat hull outer contour and inner hold area, said body having a hollow fabric casing of generally circular cross-section with integral transversely extending bulkheads dividing said casing into a plurality of individual compartments, said casing comprising a plurality of transversely extending sections including a pair of oppositely disposed annular gussets of narrower width adjacent their upper peripheries and increasing in width toward their lower peripheries to thereby provide upwardly forwardly inclined side portions, said side portions being joined together to provide a forwardly upwardly inclined bow, pneumatic bladders disposed in respective of said compartments, a fabric bottom disposed beneath said body and secured along its edge to a peripheral zone of said casing conforming in general to the contour of said boat and providing a false bottom, a flexible cockpit enclosure providing a continuous bottom and side walls comprising a fabric cup inner member and a relatively thin water-impervious resilient cup outer member, said cups being attached along their corresponding upper marginal edges to a peripheral zone of said casing disposed at the upper cross-sectional circumference thereof, the bottoms of said cups being disposed adjacent the upper face of said false bottom, said false bottom being provided with a slit opening for ready access to the space between the fabric cup member and said false bottom, and closure means for said opening.

17. In a pneumatic boat the combination of a buoyant body generally defining when inflated the outer boat hull contour and central cockpit area, said body comprising a fabric casing divided into a plurality of individual compartments by transversely extending bulkheads secured within said fabric casing and pneumatic bladders disposed in respective of said compartments, a fabric bottom disposed beneath said body casing and secured along its peripheral edge to an outer peripheral zone of said casing to thereby provide a continuous false bottom for said boat, a fabric cockpit cup disposed within the cockpit area with its central area adjacent the inner face of said bottom member and with a marginal area extending upwardly along the inner contour of said body and having its marginal edge secured to said body casing, a water-impervious pliant thermoplastic apron disposed adjacent the bottom face of said cockpit cup and carrying intimately secured to its marginal edge a fabric strip which is secured to said fabric body casing adjacent the secured edge of said cockpit cup, said attached apron providing a water-tight enclosure exterior said fabric cup, said body and bottom and apron defining a ballast tank, said bottom being provided with restricted openings therethrough serving to admit water into said ballast tank and having a slit opening therethrough and closure means therefor, whereby access may be had to the interior of said ballast tank to provide for removal of foreign matter which may accumulate therein through said restricted openings and for necessary repairs to said water-proof apron.

18. A pneumatic collapsible boat comprising a buoyant body generally defining when inflated the boat hull outer contour and hold area, said body having a hollow flexible casing of generally circular cross-section with integral flexible transversely extending bulkheads dividing said casing into a plurality of individual compartments, pneumatic bladders disposed in respective of said compartments, said casing being provided with an exterior outwardly directed welt at a zone extending longitudinally of said casing spaced upwardly from the bottom thereof and surrounding said body, and a flexible false bottom for said boat disposed over the bottom of said casing with its marginal edge attached to and forming a part of said welt.

19. A pneumatic collapsible boat comprising a buoyant body generally defining when inflated the boat hull outer contour and hold area, said body having a hollow flexible casing of generally circular cross-section with integral flexible transversely extending bulkheads dividing said casing into a plurality of individual compartments, pneumatic bladders disposed in respective of said compartments, said casing being provided with an exterior outwardly directed welt at a zone extending longitudinally of said casing spaced upwardly from the bottom thereof and surrounding said body, a flexible false bottom for said boat disposed over the bottom of said casing with its marginal edge attached to and forming a part of said welt, a cockpit enclosure disposed within said hold area and secured along an upper marginal edge to said casing along an inner zone thereof, and reinforcement strips secured to said casing at longitudinally spaced intervals thereof and extending circumferentially of the cross-section thereof from said welt upwardly to adjacent the secured upper marginal edge of said cockpit enclosure, to thereby distribute the stresses imposed on said casing by said bottom and cockpit enclosure.

20. A pneumatic collapsible boat comprising a buoyant body generally defining when inflated the boat hull outer contour and hold area, said body having a hollow flexible casing of generally circular cross-section with integral flexible transversely extending bulkheads dividing said casing into a plurality of individual compartments, pneumatic bladders disposed in respective of said compartments, said casing being provided with an exterior outwardly directed welt at a zone extending longitudinally of said casing spaced upwardly from the bottom thereof and surrounding said body, a flexible false bottom for said boat disposed over the bottom of said casing with its marginal edge attached to and forming a part of said welt, a cockpit enclosure disposed within said hold area and secured along an upper marginal edge to said casing along an inner zone thereof, reinforcement strips secured to said casing at longitudinally spaced intervals thereof and extending circumferentially of the cross-section thereof from said welt upwardly to adjacent the secured upper marginal edge of said cockpit enclosure, to thereby distribute the stresses imposed on said casing by said bottom and cockpit enclosure, loops secured to said reinforcements and disposed along an outer peripheral zone of said boat, and a rope girdle extending through said loops and supported thereby.

ABRAHAM N. SPANEL.